(12) United States Patent
Borsting et al.

(10) Patent No.: US 7,821,222 B2
(45) Date of Patent: Oct. 26, 2010

(54) SUBMERSIBLE MOTOR

(75) Inventors: Hakon Borsting, Stovring (DK); Bjarne Henriksen, Hedested (DK); Claus B. Rasmussen, Ulstrup (DK)

(73) Assignee: Grundfos Management a/s, Bjerringbro (DK)

( * ) Notice: Subject to any disclaimer, the term of this patent is extended or adjusted under 35 U.S.C. 154(b) by 196 days.

(21) Appl. No.: 11/909,997

(22) PCT Filed: Mar. 13, 2006

(86) PCT No.: PCT/EP2006/002269

§ 371 (c)(1),
(2), (4) Date: Sep. 28, 2007

(87) PCT Pub. No.: WO2006/102981

PCT Pub. Date: Oct. 5, 2006

(65) Prior Publication Data

US 2008/0191659 A1    Aug. 14, 2008

(30) Foreign Application Priority Data

Mar. 31, 2005   (EP)   .................... 05007029

(51) Int. Cl.
*H02P 1/16*    (2006.01)

(52) U.S. Cl. .................. 318/778; 318/774; 318/500; 318/459

(58) Field of Classification Search .......... 318/459, 318/500, 774, 778, 786
See application file for complete search history.

(56) References Cited

U.S. PATENT DOCUMENTS

| 3,697,841 | A | * | 10/1972 | Nystuen | 318/749 |
| 3,746,951 | A | * | 7/1973 | Hohman | 318/786 |
| 3,761,792 | A | * | 9/1973 | Whitney et al. | 318/788 |
| 4,409,532 | A | * | 10/1983 | Hollenbeck et al. | 318/749 |
| 5,013,990 | A | * | 5/1991 | Weber | 318/814 |
| 5,276,392 | A | * | 1/1994 | Beckerman | 318/751 |
| 5,325,034 | A | * | 6/1994 | Reynolds et al. | 318/782 |
| 5,391,971 | A | * | 2/1995 | Yamada et al. | 318/778 |
| 5,434,491 | A | * | 7/1995 | Marioni | 318/700 |
| 5,483,139 | A | * | 1/1996 | Welles, II | 318/782 |
| 6,208,113 | B1 | * | 3/2001 | Lelkes et al. | 318/807 |
| 6,847,183 | B2 | * | 1/2005 | Marioni | 318/700 |
| 2004/0070362 | A1 | * | 4/2004 | Patel et al. | 318/701 |

FOREIGN PATENT DOCUMENTS

| EP | 1 315 279 A3 | 1/2005 |
| JP | 59-28889 A | 2/1984 |
| JP | 8-28488 A | 1/1996 |
| JP | 8-28490 A | 1/1996 |

* cited by examiner

*Primary Examiner*—Rina I Duda
(74) *Attorney, Agent, or Firm*—Panitch Schwarze Belisario & Nadel LLP

(57) ABSTRACT

A submersible motor is provided for a submersible pump, the motor being configured as a single-phase asynchronous motor, which includes a main winding (6), an auxiliary winding (8), and a starting device (10, 14, 16, 18, 20, 22) for controlling the starting procedure of the submersible motor. The starting device (10, 14, 16, 20, 22) for the control of the current feed of the auxiliary winding (8) includes at least one electronic switch (20) in the circuit of the auxiliary winding (8).

18 Claims, 5 Drawing Sheets

SUBMERSIBLE MOTOR

CROSS-REFERENCE TO RELATED APPLICATIONS

This application is a Section 371 of International Application No. PCT/EP2006/002269, filed Mar. 13, 2006, which was published in the German language on Oct. 5, 2006, under International Publication No. WO 2006/102981 A1 and the disclosure of which is incorporated herein by reference.

BACKGROUND OF THE INVENTION

The invention relates to a submersible motor for a submersible pump.

Submersible motors are applied with submersible pumps, which are submerged with the motor into a pump sump, in order to deliver a fluid, preferably water, from this sump. These submersible motors are usually driven with alternating voltage from the public electricity mains. For this, the submersible motors are designed as asynchronous motors. Special measures are required for the start or run-up of such an asynchronous motor. Thus, at least one auxiliary winding is provided with single-phase asynchronous motors, which is applied for starting the motor or running it up. The current feed of such an auxiliary winding on running up is effected via a capacitor (capacitor-run-motor with run-up capacitor) or via a resistor (motor with resistor auxiliary phase). These known start methods for an asynchronous motor have certain disadvantages when used as a submersible motor on a submersible pump.

Thus, such motors which are started via an auxiliary winding with a resistance, have a low starting moment, which is disadvantageous with submersible motors in submersible pumps. Motors with a run-up capacitor, when used as a submersible motor, have the disadvantage that the electrolyte capacitors may not be arranged in the pump sump with certain applications, so that the starting electronics with the electrolyte capacitor must be arranged outside the pump sump, by which means the wiring effort for the connection of the submersible motor is increased, in particular at least one further electrical lead must be additionally led to the supply leads into the pump sump.

BRIEF SUMMARY OF THE INVENTION

It is an object of the invention, to create an improved submersible motor for a submersible pump, which provides for a high starting movement and may do away with the arrangement of an electrolyte capacitor for the starting procedure of the motor.

The submersible motor for a submersible pump according to the invention is designed as a single-phase asynchronous motor, and comprises a main winding as well as an auxiliary winding for starting or running up the motor. After running up, the auxiliary winding may be disconnected or however may continue to be subjected to current in regular operation of the motor, for example in the manner of a capacitor motor with an operational capacitor. Furthermore, the submersible motor according to the invention comprises a starting device which serves for the control of the starting procedure of the submersible motor. The starting device is formed by an electronic arrangement, which comprises at least one electronic switch in the circuit of the auxiliary winding. The starting device controls the current feed of the auxiliary winding during the starting phase, via this electronic switch. The electronic switch may be actuated by the starting device such that the auxiliary winding is always switched on at exactly the right points in time, in dependence on the angular position of the rotor of the submersible motor and on the phase of the supply voltage. One may thus ensure that the auxiliary winding is always fed with current at the right moment with the right phase, in order to exert a torque impulse on the rotor, i.e., the current feed is matched to the angular position of the electromagnetic field of the rotor, so that the rotor may be accelerated. The starting device may be designed as an individual electronic control device or regulation (closed-loop control) device, or however may be integrated into a superordinate control- or regulation device for operation of the submersible motor, for the actuation of the electronic switch.

The targeted controllable current feed of the auxiliary winding via the electronic switch permits a very high starting moment of the motor with a comparatively low starting current. Furthermore, no capacitor is required for the starting procedure of the motor, so that the whole starting device may be arranged directly on the submersible motor, i.e., with the pump sump. In this manner, the necessary wiring to a starting device arranged outside the pump sump becomes superfluous.

Preferably, the starting device additionally comprises an electronic switch in the circuit of the main winding for the control of the current feed of the main winding. With the starting procedure, these not only permit the auxiliary winding to be subjected to current in a targeted manner. Moreover, the main winding may also be fed in a targeted manner with current in dependence on the phase of the supply voltage, which is an alternating voltage, and on the rotor position or on the angular position of the rotor magnetic field, in order to produce a torque acting on the rotor and to start the motor. The starting procedure may be further improved by way of this.

Preferably, the electronic switch, as is applied in the circuit of the auxiliary winding and/or the circuit of the main winding, is a triac.

The starting device is preferably designed in a manner such that for starting the submersible motor, it acquires at least one characteristic value of the induced counter-voltage in the main winding and/or in the auxiliary winding, and controls the current feed of the main- and/or auxiliary winding in dependence on this value. The induced counter-voltage is dependent on the angular position of the rotor or of the rotor magnetic field, so that one may deduce the rotor position from the characteristic values of the induced counter-voltage, and the current feed of the main- and/or auxiliary winding for accelerating the rotor may be controlled in dependence on such a characteristic value, in order to ensure that the current feed is always effected such that a torque acting in the desired rotational direction of the motor acts on the rotor.

Further preferably, the starting device is designed such that for starting the submersible motor, it acquires at least one characteristic value of a supply voltage of the submersible motor and controls the current feed of the main- and/or auxiliary winding in dependence of this value. In particular, the starting device acquires the phase course of the supply voltage, so that the current feed of the main- and the auxiliary winding may be effected at the right point in time at the correct phase or the correct phase angle, in order to produce a torque acting on the rotor in the desired direction, in order to accelerate this.

According to a preferred embodiment of the invention, the starting device is designed in a manner such that for starting the submersible motor, it switches on the current feed of the auxiliary- or main winding, preferably of the main winding after a detected zero-crossing of the supply voltage, preferably for a certain time interval. Preferably, the auxiliary winding is firstly subjected to current, but it is alternatively also possible to firstly subject the auxiliary winding to current. By way of this procedure, a first magnetization of the rotor takes place on standstill of the submersible motor, in order then to be able to set the rotor into rotation by way of a further current feed of the main- and/or auxiliary winding. This current feed is effected directly after a zero-crossing of the supply voltage, so that it is ensured that the current feed is effected in a certain phase of the supply voltage. The current feed may be effected for a certain time interval and be switched off again after completion of this time interval. It is alternatively possible to switch on the current feed of the main winding in a permanent manner, and to control the further start procedure only via the current feed of the auxiliary winding.

Further preferably, the starting device is designed in a manner such that for starting the submersible motor in a second half-period of the supply voltage subsequent to the first switching-on of the current feed to the auxiliary- or the main winding, it switches on the current feed of the main- or the auxiliary winding, preferably of the main winding for a certain time interval. Depending on which of the windings is firstly fed with current, the respective other winding is fed with current in the mentioned second half-period. That is, if according to the preferred embodiment for magnetizing the rotor, it is the main winding which is fed with current first, the auxiliary winding is fed with current in the second half-period. If, according to an alternative embodiment, it is firstly the auxiliary winding which is fed with current, then the main winding is fed with current in the second half-period. Thereby, the second half-period must not directly follow the first half-period in which the first current feed of the main winding is effected, but rather this second half-period may also lie a few periods later. However, the current feed of the auxiliary winding should be effected as close as possible to the first current feed of the main winding with regard to time, such that the magnetization of the rotor due to the current feed of the main winding has not yet decayed. In this manner, a torque is produced on the rotor by way of the current feed of the auxiliary winding and on account of the previously effected magnetization of the rotor by way of the current feed of the main winding. One succeeds in a correctly directed magnetic field acting on the rotor at the right point in time, in order to accelerate this in a desired direction, by way of the fact that the current feed of the auxiliary winding is likewise effected in dependence on the period or the phase of the supply voltage. The current feed of the auxiliary winding is only effected for a certain time interval and afterwards is switched off again, so that it is only a torque impulse which acts on the rotor.

The starting device is preferably designed in a manner such that for starting the submersible motor in a third half-period of the supply voltage subsequent to the switching-on of the current feed of the main winding and the auxiliary winding, it determines an angular position of the rotor field in relation to the supply voltage or its phase course, by way of analysis of the induced counter-voltage in the main winding, and on acquiring a predefined angular position relative to the supply voltage, switches on the current feed of the main coil in a subsequent fourth half-period of the supply voltage, for a certain time interval. The third half-period in which this analysis is effected, again does not need to directly follow the first half-period in which the first current feed of the main coil is effected and/or the second half-period in which the current feed of the auxiliary winding is effected, but rather it may also be effected a few half-periods later, wherein the time interval should preferably be selected such that the effect of the preceding torque pulse on the rotor has not yet decayed, i.e., the rotor does not slow down again too much, in order to achieve a further acceleration of the rotor. It is important for the mentioned current feed of the main coil, for this to be effected in a certain angular position of the magnetic field of the rotor matching the phase of the supply voltage, so that a further torque pulse acts on the rotor in the right direction and this is not braked again. That is, the angular position of the rotor is determined such that the main winding is subjected to current with the right phase of the supply voltage at the right moment, in order to further accelerate the rotor.

Thereby, preferably the angular position of the rotor field or the magnetic field of the rotor is indirectly acquired via the induced counter-voltage in the main coil. For this, the starting device evaluates characteristic variables of the induced counter-voltage. The current feed of the main winding is effected in the fourth half-period, preferably again only for a certain time interval, thereafter it is switched off again, so that here too, only a torque impulse is produced in the desired direction.

The starting device is usefully designed such that the current feed of the auxiliary winding is switched on for a certain time interval after switching on the current feed of the main winding in successive half-period, so that a further torque impulse acts on the rotor.

The certain time intervals in which the current feed of the main winding and/or auxiliary winding is switched on according to the preceding description, are preferably in each case equal to or shorter than the duration of a half-period of the supply voltage. In this manner, one ensures that the current feed is always only effected with a rectified phase, i.e., is always effected with the same polarity, so that the magnetic field produced by the coils is always rectified and thus the torque acting on the rotor is always rectified, and the rotor may thus be set into rotation in the desired direction. This length of the time intervals may be effected in a very simple manner by way of the preferred use of triacs as electronic switches, since the triacs after closure automatically open again with the next zero-crossing of the current, and thus interrupt the current feed of the respective main- and/or auxiliary winding.

Further preferably, the starting device for determining the angular position, analyses the induced counter-voltage in the main winding at two points in time. This permits the angular position of the rotor field to be determined, alone by way of observing the induced counter-voltage in a winding, specifically in the main winding, so that one may do away with a monitoring or analysis of the induced counter-voltage in the auxiliary winding. The acquisition at two different points in time, permits the temporal course and the gradient of the induced counter-voltage to be determined in an exact manner. Alternatively, one may also acquire the induced counter-voltage in a corresponding manner only in the auxiliary winding.

According to a particularly preferred embodiment of the invention, the starting device is designed in a manner such that it switches on the previously described current feed of the main winding in the fourth half-period, when the following three conditions characterizing the predefined angular position of the rotor field relative to the phase angle of the supply voltage are satisfied. The first condition is that the gradient or slope of the counter-voltage induced in the main winding has a reverse polarity to the supply voltage. This observation is effected in the above mentioned third half-period. The second condition is that the counter-voltage induced in the main winding after the subsequent zero-crossing of the supply voltage, i.e., in the fourth half-period, has the same polarity as the supply voltage. The third condition is that in the fourth half-period, the magnitude of the counter-voltage induced in the main winding is smaller than the magnitude of the supply voltage. It is ensured by way of this third condition, that the voltage has the right polarity. By way of the three mentioned conditions, one checks that the magnetic field of the rotor and the phase of the supply voltage, on switching on the current feed of the main winding, are in the desired relation to one another, such that the main winding is subjected to current at the right point in time with the right polarity, in order to produce a torque acting on the rotor in the desired rotational direction.

The third and fourth half-period of the supply voltage with the previously described steps are preferably two directly consecutive half-periods.

Furthermore, the starting device is preferably designed such that for starting the submersible motor in the case that the angular position of the rotor field required for switching on the current feed of the main coil is not given, it continues the previously described analysis of the induced counter-voltage, until the predefined angular position for switching on the current feed of the main winding is given, and then the current feed of the main winding is switched on. By way of this, it is ensured that the starting device at some time acquires the correct point in time, in which the correct angular position of the rotor field is given, and the switches on the current feed of the main winding in order to produce a torque impulse on the rotor.

Furthermore, the starting device is usefully designed in a manner such that the switching-on of the current feed of the main winding on acquiring the predefined angular position and preferably the subsequent switching-on of the current feed of the auxiliary winding, is periodically repeated, until the starting procedure of the submersible motor is completed. In this manner, a torque impulse which acts several times successively on the rotor is produced, which accelerates the rotor. This starting procedure is continued, until the desired rotational speed of the submersible motor is reached. This rotational speed may for example lie between 40 and 70% of the nominal rotation speed. Thus, the starting procedure controlled by the starting device may, e.g., be finished on reaching this rotational speed, and the motor goes over to normal operation. The starting procedure may be finished either after a certain time duration in which normally the desired rotational sped of the motor is achieved, or the actual rotational speed of the motor may be detected via sensors or for example by way of the course of the induced counter-voltage, and the starting procedure may be finished after reaching a certain rotational speed.

The starting method according to the invention, which is controlled by the starting device, particularly advantageously proceeds in a manner, such that firstly the main winding is briefly subjected to current, in order to magnetize the rotor which is still at a standstill. Subsequently, at the beginning of a subsequent half-period, i.e., preferably a half-period with the opposite polarity to the supply voltage, the auxiliary winding is briefly subjected to current, in order to produce a first torque impulse which acts on the rotor. The rotor is set into rotation by way of this. This torque impulse may alternatively be also produced in that firstly the magnetization of the rotor is effected by subjecting the auxiliary winding to current and subsequently subjecting the main winding to current, in order to produce the torque impulse.

The previously described analysis or observation of the induced counter-voltage is subsequently effected in order to acquire an angular position of the rotor magnetic field which is suitable in relation to the phase course of the supply voltage, at which angular position the main winding is again subjected to current, in order to produce a further torque impulse acting on the rotor in the same direction. Subsequently, in the half-period which follows this, with opposite polarities of the supply voltage, the auxiliary winding is briefly subjected to current, in order to produce a further torque impulse. This current feed of the main winding and the current feed of the auxiliary winding which follows this, is repeated several times, until, as previously described, one reaches a desired rotational speed of the motor, or a certain time duration for the starting procedure has been completed.

The electronic switch in the circuit of the main winding further provides the advantage that it may optionally also assume further functions with the control and regulation of the submersible motor. Thus, the electronic switch in the circuit of the main winding may for example be additionally utilized for a phase control, for adapting the submersible motor to different supply voltages, so that for example one and the same submersible motor may be selectively operated at 230 Volts or 110 Volts supply voltage. Thereby, in the known manner, the motor may preferably be designed for the lowest possible supply voltage, and reduces a possibly higher supply voltage by way of the phase control. It is for example further possible to apply the electronic switch as an excess voltage protection for the submersible motor. Furthermore, in combination with a temperature sensor, for example one may also carry out a switching-off of the current feed given an overheating of the submersible motor. The electronic switch cooperates with a control- and regulation device for the operation of the submersible motor, for this additional function, in which control- and regulation device preferably the described starting device is also integrated. A multitude of functions may be realized with a simple construction of the control of the motor in this manner.

According to a preferred embodiment of the invention, a capacitor with a further electronic switch, and which is connected in parallel with the electronic switch and preferably arranged in the motor, may be provided in the circuit of the auxiliary winding, wherein the starting device or the control device is designed in a manner such that the auxiliary winding may be subjected to current via the capacitor by way of the further electronic switch after completion of the starting procedure. It is thus possible to start the motor according to the previously described method, and to subsequently operate the motor as a capacitor-run-motor with an operational capacitor. The required capacitance is preferably arranged in the inside of the motor near to the winding. One may possibly also use capacitors without electrolyte as an operational capacitor, so that the arrangement of the operational capacitor in the submersible motor itself is not a problem in many cases of application, in which however the arrangement of an electrolyte capacitor as a starting capacitor in the submersible motor itself is not desired.

The starting device is preferably arranged in a housing of the submersible motor on an axial side of the motor which is provided for the connection of a pump, i.e., on the shaft-side winding head of the submersible motor. The connection, in particular a connection plug for the electrical supply lead of the submersible motor, is preferably also provided in this region. One may thus achieve a compact construction of the submersible motor.

The control of the starting procedure via the electronic switch in the previously described manner or according to the previously described embodiments, according to a particular embodiment of the invention, permits the influencing of the starting moment on running up the motor. Thus, it is possible to let the motor firstly run up with a low starting moment, and then to increase the starting moment only in the case that the motor should not run up as is wished. In this manner, the torque impacts which occur on running up the motor and which act on the connected pump are reduced. This leads to lower loading of the parts transmitting the torques, so that the wear of these parts and the pump may be reduced on running up. Furthermore, in this manner, one may also reduce the noise formation on running up, which is particularly important with the application of the submersible motor in a house water system.

The reduction of the starting moment may be achieved by way of reducing the time intervals in which the auxiliary- and/or the main winding are subjected to current for producing the torque impulses on the rotor. Such a shortening may preferably be effected by way of a later switching-on of the electronic switches for subjecting the main- and auxiliary winding to current. This has the advantage that the automatic switch-off point in time remains uninfluenced, for example with the use of a triac. Alternatively or additionally, the duration of the current feed may also be achieved by way of an earlier switching-off of the electronic switches.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
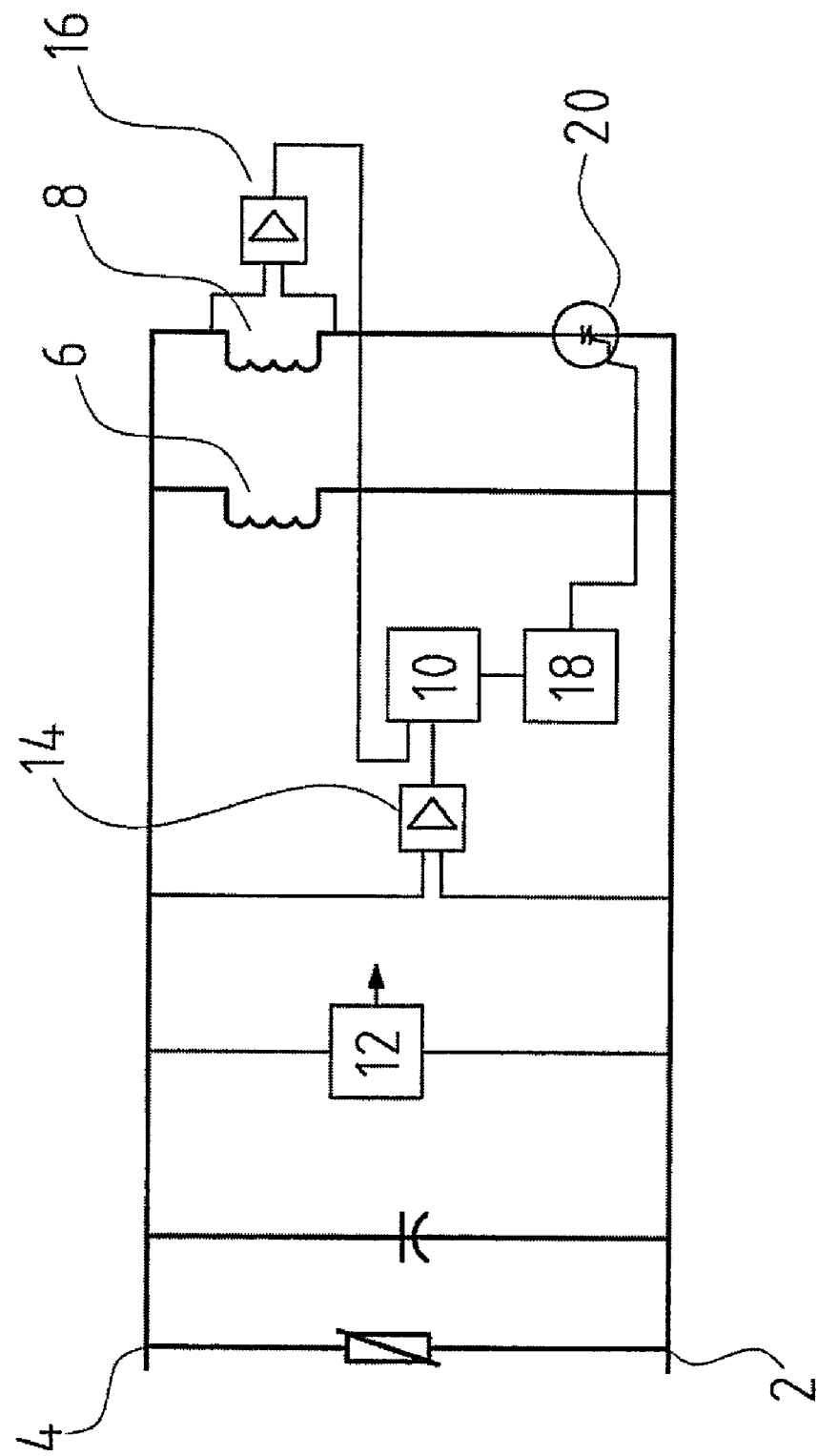
FIG. 1 is a schematic circuit diagram of a first embodiment of the starting device of the submersible motor according to the invention.

FIG. 1 schematically shows the circuit diagram of the submersible motor according to a first embodiment of the invention. A main winding 6 and an auxiliary winding 8 of the submersible motor are connected between the two poles 2 and 4 of the supply voltage, i.e., a neutral lead 2 and the phase 4.

The starting device which controls the current feed of the windings or the coils of the submersible motor in the starting procedure, as an essential element, comprises a controller or a control device 10 which are supplied with current by way of an energy supply 12 via the connection poles 2 and 4 of the submersible motor, wherein the energy supply device 12 prepares the direct voltage required for the control device 10. The control device 10 is connected to two acquisition devices 14 and 16, of which the acquisition device 14 acquires the voltage between the poles 2 and 4, i.e., the supply voltage, and the acquisition device 16 acquires the voltage across the auxiliary winding 8. The acquisition device 16 thereby acquires the counter-voltage which is induced in the auxiliary winding 8 by the magnetized, rotating rotor. The control device 10 evaluates the course of the supply voltage prevailing between the poles 2 and 4, as well as the course of the induced counter-voltage prevailing across the auxiliary winding 8, and by way of this, controls the current feed of the auxiliary winding 8, as will yet be described in more detail. For this, the control device 10 is connected to an activation unit 18 which activates an electronic switch 20 in the form of a triac, which is situated in the branch or the current circuit of the auxiliary winding 8 between the poles 2 and 4.

The control device, by way of opening and closing the electronic switch 20 by way of actuating the activation unit 18, may control the current feed of the auxiliary winding 8 in dependence on the voltage courses between the poles 2 and 4 and across the auxiliary winding, which are acquired by the acquisition devices 14 and 16. Thus the control device 12 may switch on the current feed of the auxiliary winding 8 always exactly when the phase or the phase angle of the supply voltage has a certain relation to the angular position of the rotor magnetic field, so that a torque impulse is produced onto the rotor, in order to set the rotor in motion.

Figure 2:
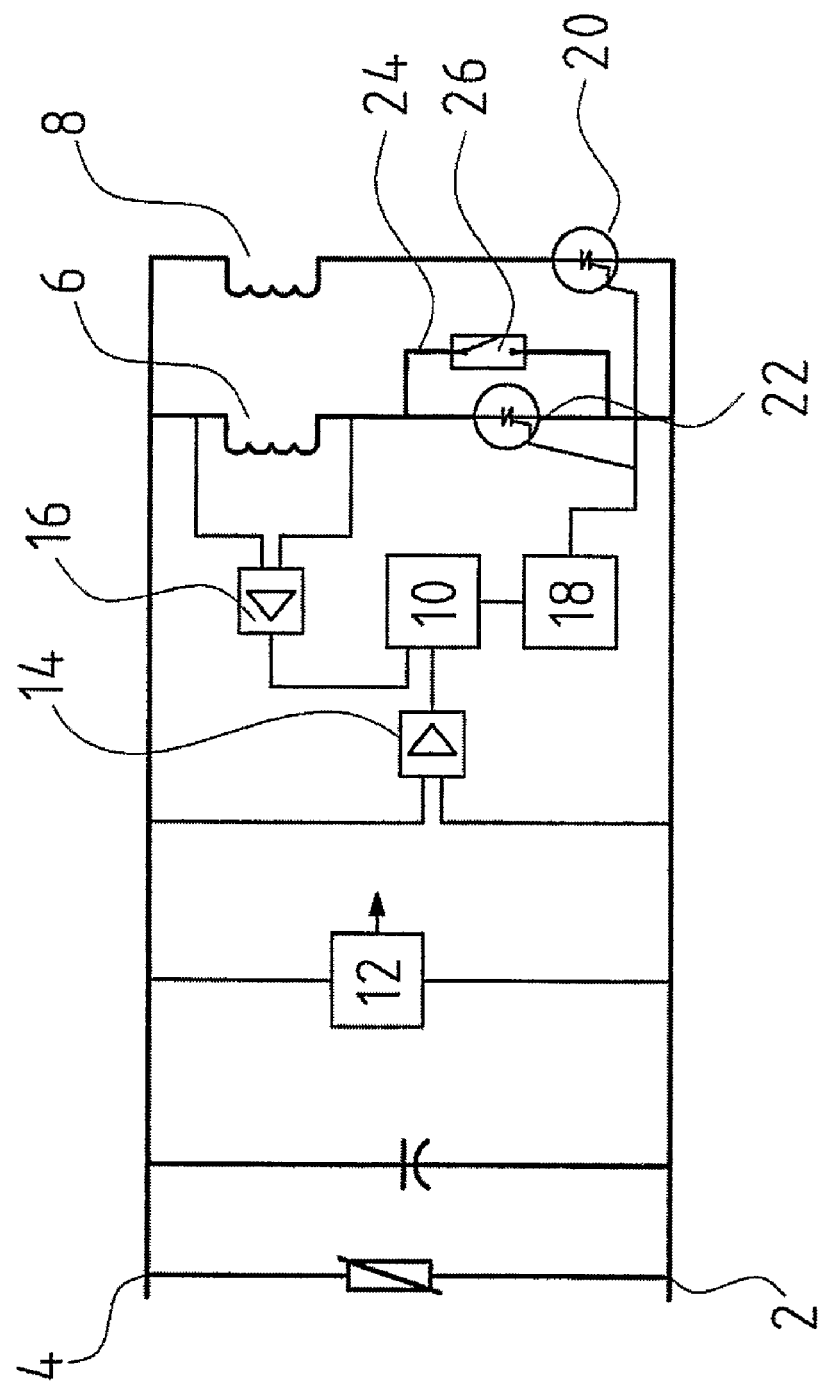
FIG. 2 is a schematic circuit diagram of a second embodiment of the starting device of the submersible motor according to the invention.

FIG. 2 shows a schematic circuit diagram of a submersible motor according to a second embodiment of the invention. The arrangement corresponds in many parts to that arrangement described by way of FIG. 1, so that only the differences are discussed hereinafter. The first significant difference to the embodiment according to FIG. 1 lies in the fact that with the second embodiment, it is not the induced counter-voltage in the auxiliary winding 8 which is acquired by the acquisition device 16, but the induced counter-voltage in the main winding 6, and for this, the acquisition device 16 taps the voltage across the main winding 6. The counter-voltage induced in the main winding 6 may also be used to determine the angular position of the rotor magnetic field. A further difference lies in the fact that an electronic switch 22 is also arranged in the branch or the circuit of the main winding 6 between the poles 2 and 4. This switch 22 is also designed as a triac. The electronic switch 22 is also activated by the activation unit 18 which receives the control commands from the control device 10. Additionally, a bypass 24 is provided which may bypass the electronic switch 22. A switch 26 in the form of relay is arranged in the bypass 24, which is likewise activated by the control device 10 or a central control device for the motor control.

This second embodiment permits the control device 10 to switch on the current feed of the auxiliary winding 8 as well as the current feed of the main winding 6, for starting the submersible motor, in order to subject the main winding 6 and the auxiliary winding 8 to current in dependence on the acquired angular position of the rotor magnetic field at the right time with the right polarity of the supply voltage, i.e., with the correct phase of the supply voltage, in order to produce torque impulses which act on the rotor for its acceleration. After completion of the starting procedure, i.e., when the submersible motor has reached a certain rotational speed, the electronic switch 20 remains opened, so that the auxiliary winding 8 is not further subjected to current. The switch 26 is then closed, in order to bypass the electronic switch 22 which is then likewise open, and to permanently subject the main winding 6 to current with the supply voltage prevailing between the poles 2 and 4.

Figure 3:
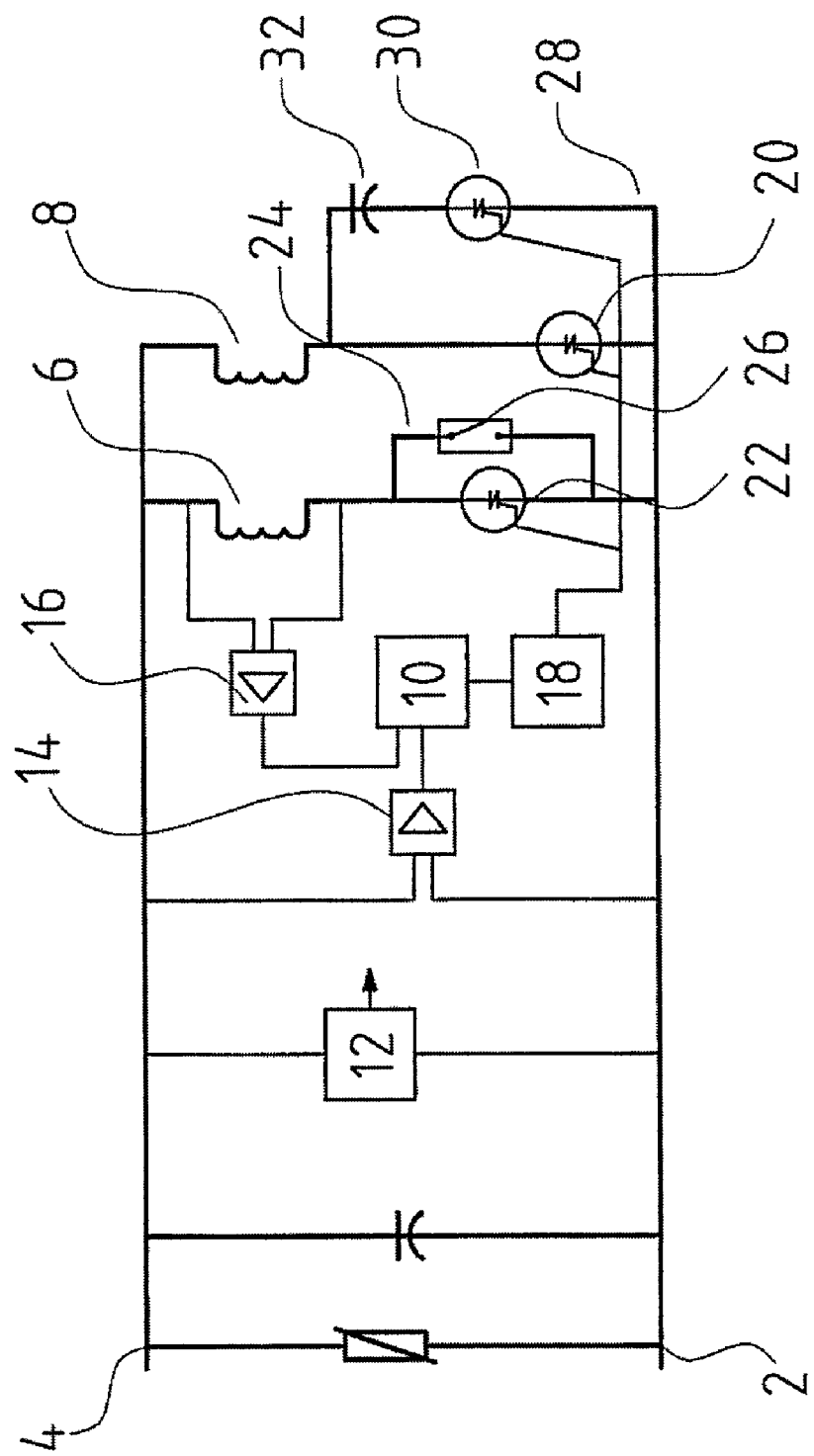
FIG. 3 is a schematic circuit diagram of a third embodiment of the starting device of the submersible motor according to the invention.

FIG. 3 shows a circuit diagram of a submersible motor according to a third embodiment of the invention. This third embodiment corresponds essentially to the embodiment described by way of FIG. 2, so that hereinafter only the differences are explained. The third embodiment differs from the embodiment in FIG. 2 only in that a further bypass 28 is provided, which bypasses the electronic switch 20 in the branch or circuit of the auxiliary winding 8. A further electronic switch 30, as well as a capacitor 32, is arranged in the bypass 28.

With the bypass 28, the motor may be operated as a capacitor-run-motor with an operating capacitor (capacitor 32). For this, the electronic switch 20 is opened by the control device 10 via the activation unit 18, after the end of the starting procedure. As already described, the electronic switch 22 is also opened, and instead the switch 26 in the bypass 24 is closed, in order to permanently subject the main winding 6 to current. Simultaneously, for normal operation of the motor after completion of the starting procedure, the electronic switch 30 is closed by the control device 10 via the activation unit 18. In this manner, the auxiliary winding 8 also is permanently subjected to current via the bypass 28, wherein the capacitor 32 lies as an operational capacitor in the circuit of the auxiliary winding 8. The operational capacitor 32 may be designed as a capacitor without electrolyte, so that this capacitor 33 may also be applied where no electrolyte capacitor may be arranged in the pump sump. The capacitor 32 is preferably arranged directly in the vicinity of the auxiliary winding 8 in the inside of the motor.

Figure 4:
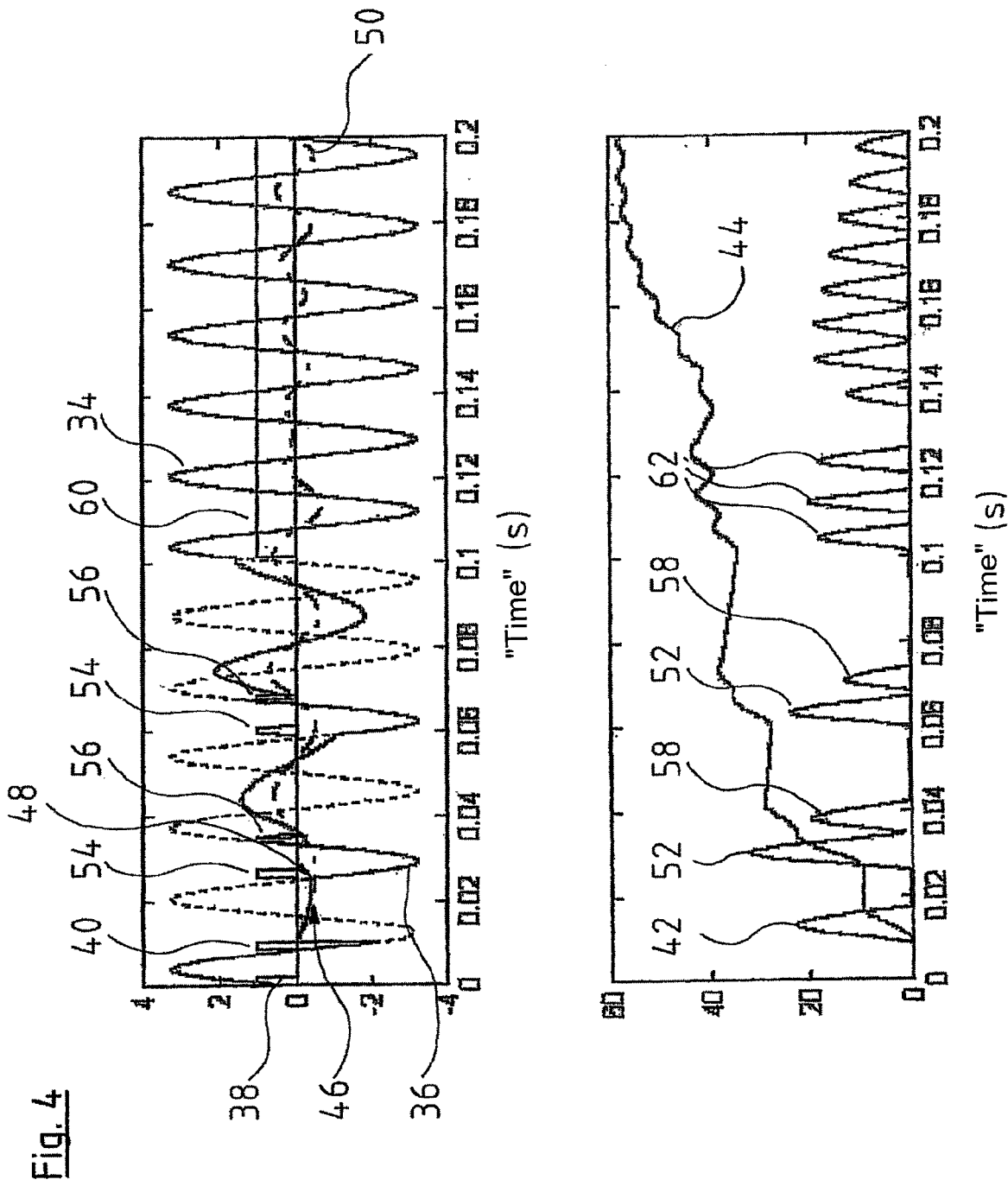
FIG. 4 is a diagram in which the voltage course, rotational speed and torque are represented during the starting procedure.

The starting procedure or the starting method, as is applied with the embodiment examples according to FIGS. 2 and 3, is not described hereinafter in more detail by way of the diagrams in FIG. 4. In the upper diagram, the voltage courses of the supply voltage as well as the induced voltage in the main winding 6 in the unit V/100 is represented as a temporal course. The torque course in the unit Nm, as well as the rotor speed in Hz, is represented in the lower part of the diagram.

The voltage running with a uniform period represented with an unbroken line is in the phase course of the supply voltage 34 between the poles 2 and 4. The course 34 of the supply voltage is represented in a dashed manner in the region of the start procedure. In this region, the course of the induced counter-voltage 36 in the main winding 6 is represented by the unbroken line. Furthermore, the control impulses which are delivered by the activation unit 18 to the electronic switches 20 and 22 are represented in the upper part of the diagram. The rotor is idle at the beginning of the method at the point in time zero, and the electronic switch 22 is closed by the switch impulse 38 directly after a zero-crossing of the supply voltage 34, and the main winding 6 is subjected to current for the first time in this manner. This leads to a first magnetization of the rotor. Since the electronic switches 20, 22 are designed as triacs, this current feed of the main coil ends with the next zero-crossing of the supply current. After the next zero-crossing of the supply voltage 34, a switch impulse 40 is delivered by the control unit 18 in the second half-period on account of the control device 10, which closes the electronic switch 20, so that the auxiliary winding 8 is subjected to current. Thus current feed of the auxiliary winding 8 also ends with the next zero-crossing of the supply voltage 24, with which the electronic switch 20 is automatically opened again. This brief current feed of the auxiliary winding 8 leads to a first torque impulse 42 which is to be recognized in the lower part of the diagram of FIG. 4. This first torque impulse 42 acts on the previously magnetized rotor, so that it is set into rotation, as may be recognized from the graph 44 which represents the rotational speed of the rotor. The current feed of the auxiliary winding 8 in the second half-period need not directly follow the half-period in which the main winding 6 was subjected to current for the first time. Rather, this current feed may also be effected a few half-periods later, wherein it must be ensured that the magnetization of the rotor has not yet decayed, and the polarity of the half-period is preferably the opposite of the first half-period, in which the main winding 6 was subjected to current for the first time.

An analysis of the counter-voltage 36, which is induced in the main winding 6 and which is acquired by the acquisition device 16, is then effected in the subsequent third half-period. If the gradient or the slope of the induced counter-voltage 36 has the opposite polarity to the supply voltage 34, a first condition for the renewed switching on of the current feed of the main winding 6 is fulfilled. This is the case at point 46. The second condition for switching-on of current feed of the main winding is that the induced counter-voltage 36 has the same polarity as the supply voltage 34 after the next zero-crossing of the supply voltage 34, i.e., in the half-period subsequent to this. This is the case at point 48. At the same time, the magnitude of the induced counter-voltage 36 should be smaller than the magnitude of the supply voltage 34 as a third condition. This is likewise the case at point 48, so that at this point in time by way of acquiring these three conditions, it is ascertained that the phase course of the rotor magnetic field 50 at this point is in the desired unison with the phase course of the supply voltage 34, i.e., both are directed in their polarity, such that on subjecting the main coil 6 to the supply voltage 34, a further torque pulse 52 is produced, which further accelerates the rotor, as is to be recognized on the graph 44. The further torque pulse 52 is effected by way of producing a switch impulse 54, which is delivered by the activation unit 18 for closing the electronic switch 22.

A further switch impulse 56 is delivered to the electronic switch 20 in the half-period which follows this, i.e., after the next zero-crossing of the supply voltage 34, so that the auxiliary winding 8 is subjected to current with the opposite polarity of the supply voltage 34 and thus a further torque impulse 58 is produced on the rotor, so that this is accelerated further. The switch impulses 54 and 56 effect a closure of the electronic switches 22 and 20, and the switches open automatically again with the next zero-crossing of the current.

The described analysis of the induced counter-voltage 36 in relation to the phase course of the supply voltage 34 is subsequently repeated several times, so that whenever the same conditions of the relation of the supply voltage 34 to the phase course of the rotor magnetic field 50 are given, the switch impulses 54 and 56 for closing the electronic switches 22 and 20 are delivered, by which means renewed torque pulses 52 and 58 are delivered. The torque pulses 52 and 58 which are produced by subjecting the main winding 6 and the auxiliary winding 8 to current, are all equally directed, so that the rotor is further accelerated.

If the rotor speed has reached a certain level, the starting procedure is completed, and the switch 26 in the circuit of the main winding 6 is closed by way of the permanent switch impulse 60 which sets in at 0.1 seconds in the diagram, so that this main winding is permanently subjected to current. By way of this, then regular torque impulses are produced in the normal known operation of the asynchronous motor, so that the rotor is further accelerated to the constant nominal rotational speed, as may be recognized from the course of the graph 44.

Figure 5:
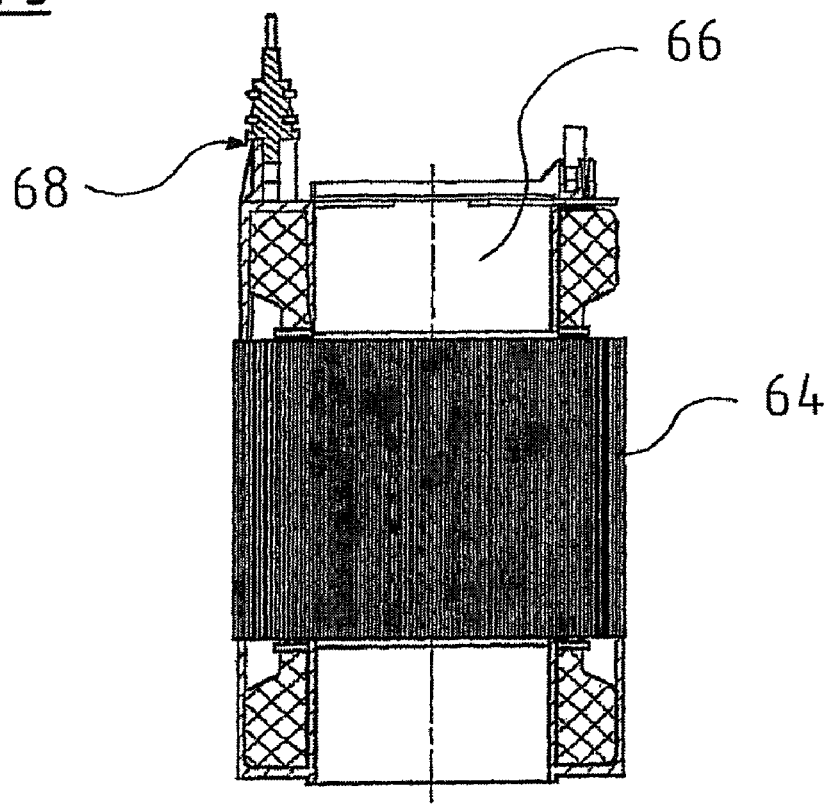
FIG. 5 is a sectioned view of a submersible motor according to the invention.
Figure 6:
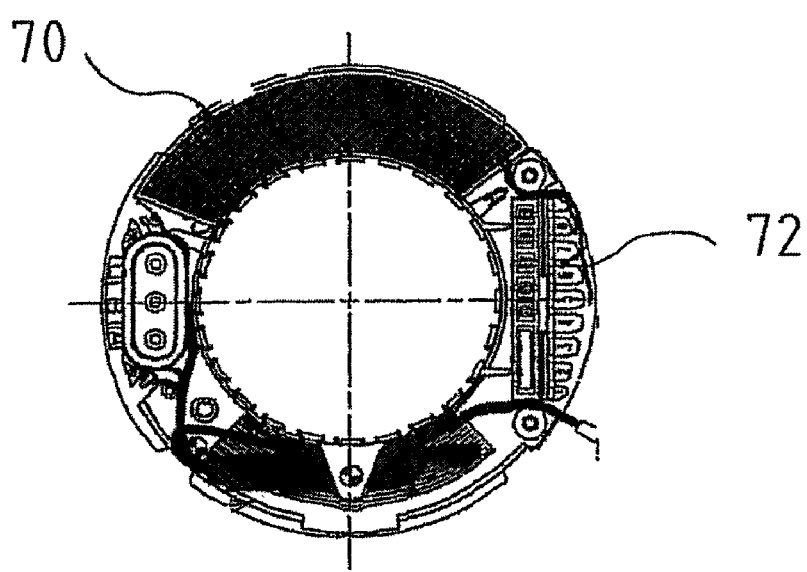
FIG. 6 is a plan view of the submersible motor according to FIG. 5.

FIGS. 5 and 6 show one example for the constructive construction of the submersible motor according to the invention. The stator 64 is shown in the partly sectioned view in FIG. 5, the rotor is not shown and is inserted into the central opening 66 of the stator. A submersible pump (not shown here) to be applied to the submersible motor, connects on the end of the stator 64 which is at the top in FIG. 5, and this end is indicated as the shaft-side winding head of the stator 64. A connection plug extending axially and on which the supply lead for the submersible motor is connected, is formed at this end close to the outer periphery of the stator 64. A circuit board 70 is also arranged in the region of the shaft-side winding head (see FIG. 6), on which the electronic components of the previously described starting device 10 are arranged. Diametrically opposite to the connection plug 68 the connection terminals 72 for the coil wires of the motor are arranged. This arrangement of the electronics for the starting device or control device 10 of the submersible motor leads to a compact construction of the submersible motor according to the invention.

For the application of the previously described starting device as well as the implementation of the described starting method, the windings of the motor are preferably specially adapted. The main winding 6 thereby is preferably not changed with respect to common asynchronous motors with a conventional starting device (capacitor or resistor). The auxiliary winding 8 however is preferably arranged such that the starting current, as well as the heating of the motor, remain within acceptable limits during the starting procedure. It is particularly preferably for the auxiliary winding 8 thereby to be designed such that it comprises 50 to 80% of the windings of the main winding 6, further preferably between 60 and 75% of the windings of the main winding 6.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A submersible motor for a submersible pump, the motor being a single-phase asynchronous motor comprising a main winding (6), an auxiliary winding (8) and a starting device (10, 14, 16, 18, 20, 22) for control of a starting procedure of the submersible motor, wherein the starting device (10, 14, 16, 18, 20, 22) comprises at least one electronic switch (20) in a circuit of the auxiliary winding (8), the at least one electronic switch being configured to switch on a current feed in the circuit of the auxiliary winding in a manner that is timed so as to match an angular position of an electromagnetic field of a rotor.

2. The submersible motor according to claim 1, wherein the starting device (10, 14, 16, 18, 20, 22) for control of a current feed of the main winding (6) comprises an electronic switch (22) in a circuit of the main winding (6).

3. The submersible motor according to claim 2, wherein the electronic switch (20, 22) is a triac.

4. The submersible motor according to claim 1, wherein the starting device (10, 14, 16, 18, 20, 22) is configured such that, for starting the submersible motor, the starting device acquires at least one characteristic value of an induced counter-voltage (36) in the main winding (6) and/or in the auxiliary winding (8), and controls a current feed of the main winding (6) and/or the auxiliary winding (8) in dependence of the characteristic value.

5. The submersible motor according to claim 1, wherein the starting device (10, 14, 16, 18, 20, 22) is configured such that, for starting the submersible motor, the starting device acquires at least one characteristic value of a supply voltage (34) of the submersible motor and controls the current feed of the main winding (6) and/or the auxiliary winding (8) in dependence on this value.

6. The submersible motor according to claim 1, wherein the starting device (10, 14, 16, 18, 20, 22) is configured such that, for starting the submersible motor, the starting device switches on a current feed of the auxiliary winding or the main winding (6), after a detected zero-crossing of a supply voltage (34) for a certain time interval.

7. The submersible motor according to claim 6, wherein the starting device (10, 14, 16, 18, 20, 22) is configured such that, for starting the submersible motor in a second half-period of the supply voltage (34), which is subsequent to a first switching-on (38) of the current feed of the auxiliary winding or the main winding (6), the starting device switches on the current feed of the main winding or auxiliary winding (8) preferably for a certain time interval.

8. The submersible motor according to claim 7, wherein the starting device (10, 14, 16, 18, 20, 22) is configured such that, for starting the submersible motor in a third half-period of the supply voltage (34) subsequent to the switching-on (38) of current feed of the main winding (6) and of the auxiliary winding (8), the starting device determines an angular position of the rotor field (50) in relation to the supply voltage (34) by way of analysis of an induced counter-voltage (36) in the main winding (6), and on detecting a predefined angular position of the rotor field (50), the starting device switches on the current feed of the main winding (6) in a subsequent fourth half-period of the supply voltage (34) for a certain time interval.

9. The submersible motor according to claim 8, wherein the starting device (10, 14, 16, 18, 20, 22) is configured such that, after switching-on the current feed of the main winding (6) in a subsequent half-period, the current feed of the auxiliary winding (8) is switched on for a certain time interval.

10. The submersible motor according to claim 6, wherein the certain time interval is equal to or shorter than a duration of a half-period of the supply voltage (34).

11. The submersible motor according to claim 8, wherein the starting device (10, 14, 16, 18, 20, 22) analyses the induced counter-voltage (36) in the main winding at two points in time (46, 48), for determining the angular position.

12. The submersible motor according to claim 8, wherein the starting device (10, 14, 16, 18, 20, 22) is configured such that it switches on the current feed of the main winding (6) in the fourth half-period, when the following three conditions characterizing the predefined angular position are fulfilled:
 a) a gradient of the counter-voltage (36) induced in the main winding (6) has a reverse polarity to the supply voltage (34),
 b) after a subsequent zero-crossing of the supply voltage (34), the counter-voltage (36) induced in the main winding (6) in the fourth half-period has a polarity equal to the supply voltage (34),
 c) in the fourth half-period, a magnitude of the counter-voltage (36) induced in the main winding (6) is smaller than a magnitude of the supply voltage (34).

13. The submersible motor according to claim 8, wherein the third and fourth half-periods of the supply voltage (34) are two directly consecutive half-periods.

14. The submersible motor according to claim 8, wherein the starting device (10, 14, 16, 18, 20, 22) is configured such that, for starting the submersible motor in a case that the angular position of the rotor field (50) required for switching on the current feed of the main winding (6) is not given, the starting device continues the analysis of the induced counter-voltage (36) until the predefined angular position is given, and then switches on the current feed of the main winding (6).

15. The submersible motor according to claim 8, wherein the starting device (10, 14, 16, 18, 20, 22) is configured such that the switching-on (54) of the current feed of the main winding (6) on detecting the predefined angular position and the subsequent switching-on (56) of the current feed of the auxiliary winding (8) are repeated periodically, until the starting procedure of the submersible motor is completed.

16. The submersible motor according to claim 2, wherein the electronic switch (22) in the circuit of the main winding (6) is additionally used for a phase-angle control for adapting the submersible motor to different supply voltages, and/or as an overvoltage protection, and/or in combination with a temperature sensor for switching off the current feed on overheating of the submersible motor.

17. The submersible motor according to claim 1, further comprising a capacitance (32) having a further electronic switch (30) and being connected in parallel to the electronic switch (20), the capacitance being provided in a circuit of the auxiliary winding (8), wherein the starting device (10, 14, 16, 18, 20, 22) or a control device is configured such that the auxiliary winding (8) may be subjected to current via the capacitance (32) via the further electronic switch (30) after completion of the starting procedure.

18. A submersible motor according to claim 1, wherein the starting device (10, 14, 16, 18, 20, 22) is arranged in a housing of the submersible motor on an axial side of a motor provided for connection of a pump.

* * * * *